Nov. 22, 1938.                R. W. MOORE                 2,137,947
                    HYDRAULIC LEVELIZER FOR AUTOMOBILES
                         Filed Oct. 12, 1936        2 Sheets-Sheet 1
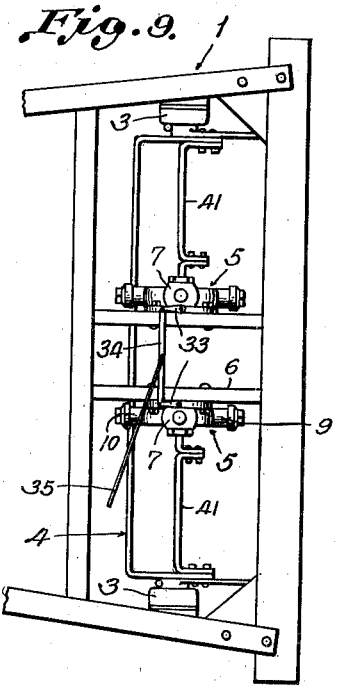
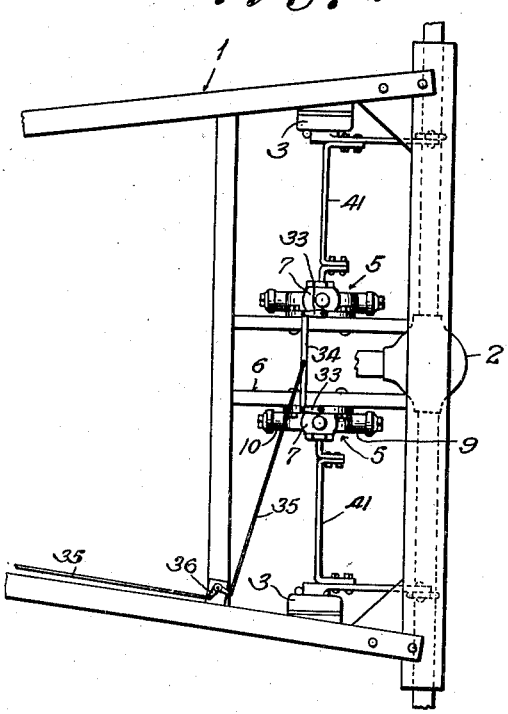
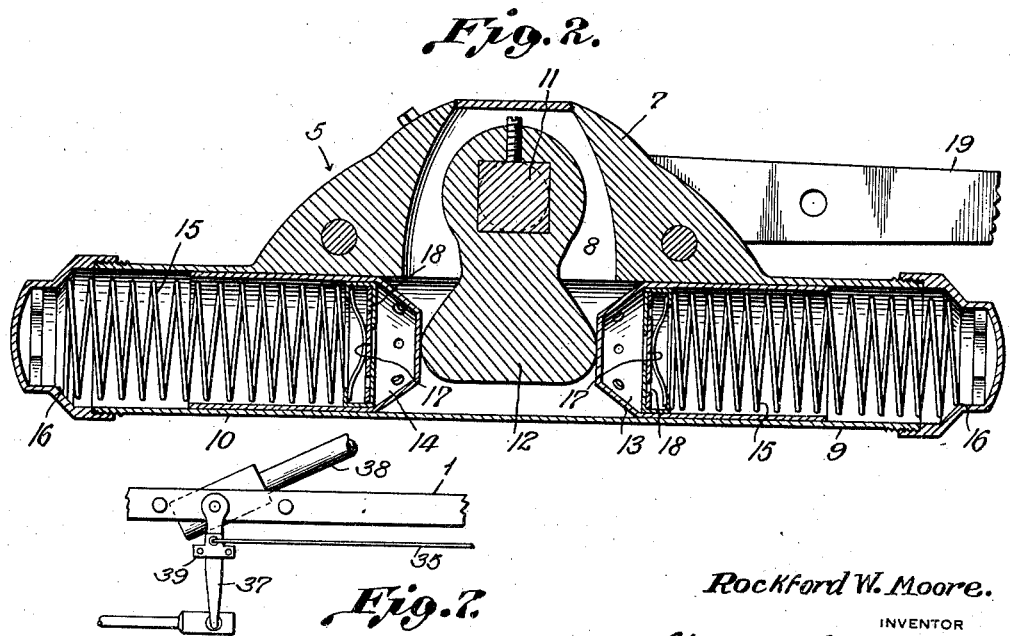
Rockford W. Moore.
INVENTOR
BY Victor J. Evans & Co.
ATTORNEYS Nov. 22, 1938. R. W. MOORE 2,137,947
HYDRAULIC LEVELIZER FOR AUTOMOBILES
Filed Oct. 12, 1936 2 Sheets-Sheet 2
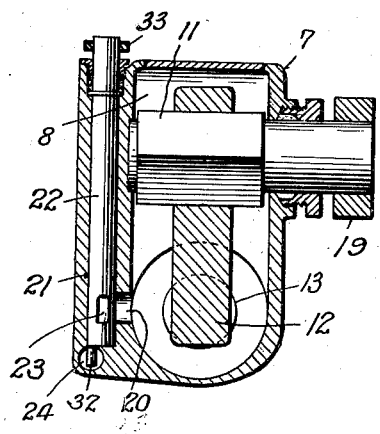
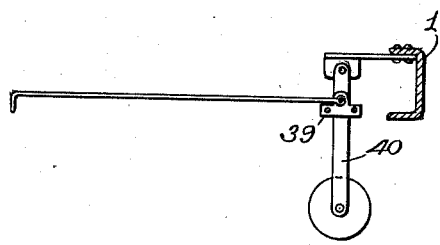
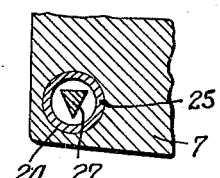
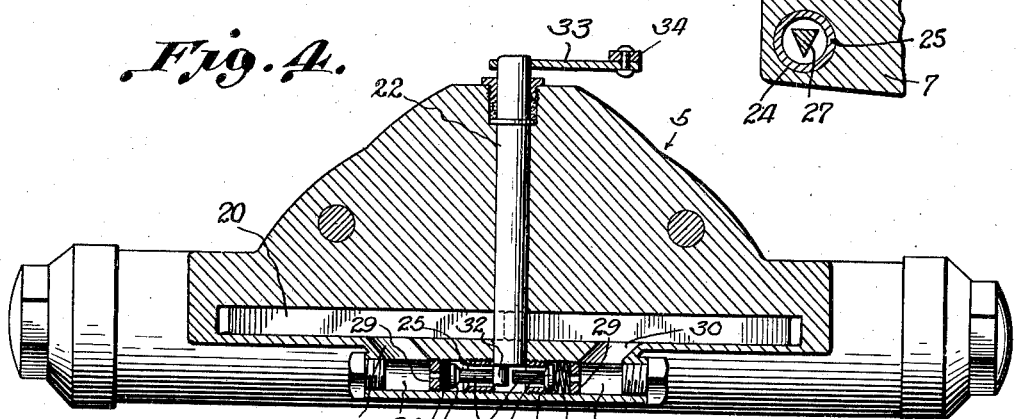
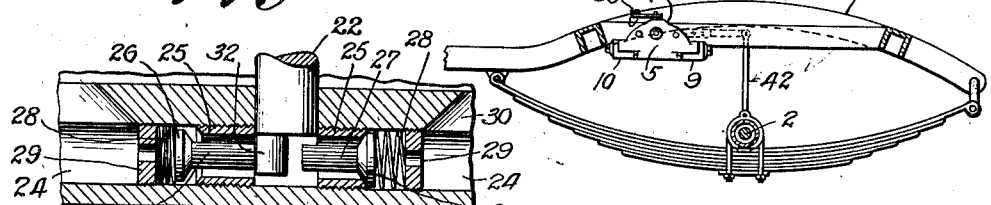
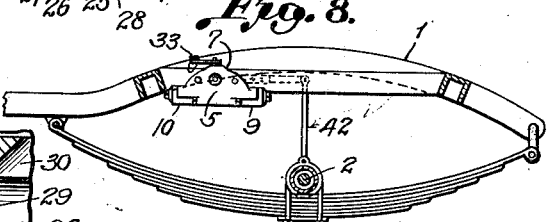
Rockford W. Moore.
INVENTOR Patented Nov. 22, 1938

2,137,947

UNITED STATES PATENT OFFICE 2,137,947

HYDRAULIC LEVELIZER FOR AUTOMOBILES

Rockford W. Moore, Kansas City, Mo.

Application October 12, 1936, Serial No. 105,303

5 Claims. (Cl. 280—112)

This invention relates to hydraulic levelizers or stabilizers for automobiles and has for the primary object the provision of a device of this character which will permit the springs of an automobile to function normally during the travel of the automobile in a straight course and to check the springs when traveling on a curve to prevent tilting of the automobile body in the direction of the outside of the curve, due to centrifugal force so as to maintain the automobile body on a substantially even keel to provide safer and more comfortable riding for the occupants of the automobile.

Another object of this invention is the provision of a device of the above stated character which will automatically tilt the automobile body towards the inside of the curve and maintain said body thus tilted when the wheels of the automobile on the outside of the curve engage road obstruction, to provide a banking effect, tending to prevent skidding and to automatically release the body to return to a level position by the automobile proceeding in a straight course.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary plan view illustrating stabilizers or levelizers for an automobile and showing the application thereof to a chassis of the automobile and the connection of said devices to the conventional type of double acting shock absorbers now employed on automobiles.

Figure 2 is a vertical sectional view illustrating one of the stabilizers or levelizers.

Figure 3 is a transverse sectional view showing the rotary valve for controlling the bypass between the cylinders of the stabilizers or levelizers.

Figure 4 is a horizontal sectional view showing the bypass between the cylinders of the stabilizers or levelizers and the opposed check valves and the operating means therefor.

Figure 5 is an enlarged fragmentary sectional view showing one of the check valves held open and the other permitted to remain closed.

Figure 5a is a diagrammatical view showing the check valves of a pair of the stabilizers or levelizers and the operating means therefor.

Figure 6 is a fragmentary sectional view showing the stem of one of the check valves.

Figure 7 is a fragmentary view showing the connection between the stabilizers or levelizers and the steering mechanism of the automobile.

Figure 7a is a fragmentary transverse sectional view showing a pendulum mounted to a chassis controlling the stabilizers or levelizers.

Figure 8 is a fragmentary longitudinal sectional view showing the connection of one of the stabilizers or levelizers with the chassis and axle of the automobile.

Figure 9 is a fragmentary plan view showing my invention connected to the chassis and shock absorbers carried thereby and with the latter connected by a stabilizing bar now in use on automobiles.

Referring in detail to the drawings, the numeral 1 indicates a fragmentary portion of an automobile chassis and 2 the axle housing. Adapted to the chassis 1 and to the axle housing are conventional double acting hydraulic shock absorbers 3. While my invention is shown connected with the shock absorbers 3, it is to be understood that the shock absorbers are merely employed for establishing a connection between my invention and the axle housing 2. The present invention may be so mounted on the chassis and connected to the axle housing 2 that it is not necessary to utilize the shock absorbers as connecting mediums. In Figure 9 the shock absorbers 3 are shown connected by a stabilizing bar 4 and also have connected thereto my invention. The stabilizing bar 4 is now in use on automobiles connecting arms of the opposed pairs of shock absorbers and forms no part of the present invention.

The stabilizers or levelizers are indicated generally by the character 5 and are arranged in pairs and are mounted on the chassis 1 by a subframe 6. Each stabilizer or leverizer 5 consists of a casting 7 bolted or otherwise secured to the subframe and has formed therein a chamber 8 and opposed cylinders 9 and 10 in direct communication with each other and the chamber 8. Journaled in the casting 7 is a shaft 11 having secured thereto a piston operating element 12. The element 12 lies in the chamber 8 and projects into the cylinders to be engaged on opposite sides by pistons 13 and 14. The pistons 13 and 14 are reciprocally mounted in the cylinders 9 and 10, respectively. The pistons 13 and 14 are urged into engagement with the element 12 by coil springs 15, seats 16 being provided in the outer ends of the cylinders for the springs to engage. Formed in the pistons 13 and 14 are spring seated check valves 17. The pistons 13 and 14 have comparatively long skirts, as clearly shown in Figure 2, with the check valves 17 positioned between the free ends of the skirts and the heads of the pistons, the latter being provided with ports or apertures 18.

Secured to the shaft 11 is an arm 19 and formed in the casting 7 is a bypass 20 connecting the cylinders adjacent their outer ends. A valve chamber 21 is formed in the casting in communication with the bypass intermediate the ends thereof and rotatably mounted in the valve chamber is a rotary valve 22 having a port 23 which when aligned with the bypass opens the cylinders 9 and 10 to each other by way of said bypass and when out of registration with the bypass closes said cylinders to each other, that is, between the outer ends of the cylinders and the pistons.

Check valve chambers 24 are formed in the casting and are opposed and are in communication with each other and arranged between said check valve chambers are valve seats 25 engaged by spring pressed check valves 26 opposed to each other and each equipped with a stem 27. Coil springs 28 act to urge the check valves 26 in engagement with their seats 25 and the springs are seated against said valves and spiders 29 arranged in the check valve chambers 24. The chambers 24 are in communication with the bypass 20 on opposite sides of the rotary valve by ports 30. The rotary valve 22 is journaled in the casting 7 and has formed thereon a cam 32 located between the stems 27 of the check valves 26, the purpose of which is to alternatingly open the check valves depending in which direction the rotary valve 22 is rotated. An arm 33 is secured to the rotary valve 22.

The arms 33 of the stabilizers or levelizers are connected by a link 34 and through a series of rods 35 and bell crank levers 36 the connecting link 34 is caused to shift in opposite directions by the backward and forward movements of the steering arm 37 of the steering mechanism 38 of the automobile. One of the rods 35 is connected to the steering arm 37 by a bracket 39 which may be adjusted upwardly and downwardly of the steering arm.

Instead of depending on the steering arm 37 for effecting operation of the check valves a pendulum 40 may be employed by having the clamp or bracket 39 applied thereto and the pendulum mounted for pivotal movement on the chassis 1, that is, for the pendulum to swing transversely of the chassis.

The hookup described between my invention and the steering mechanism of the automobile or with the pendulum 40 will bring about operation of the check valves of the pair of stabilizers or levelizers shown in Figure 1 when the vehicle proceeds on a curve either to the right or left. It is to be noted that in mounting the stabilizers or levelizers on the chassis, the cylinders are disposed horizontally and the arms 19 thereof have secured thereto rods 41 which are in turn secured to the arms of the shock absorbers 3. However, as before stated, the shock absorbers may not necessarily be employed in connection with my invention and in that case the rods will be connected to the axle 2 by structure similar to that employed for connecting the arms of the shock absorbers to the axle housing, this structure being indicated in Figure 8 by the numeral 42.

The torque rods 41 are of sufficient strength to resist twisting. However, they will possess sufficient spring action to have a cushioning effect.

In operation, when the vehicle is traveling on a curve one check valve of each stabilizer or levelizer is forced into an open position by the cam 32 and its companion valve remains closed. This applies to both stabilizers or levelizers except the check valves which are forced open by their respective cams are opposed to each other and also the check valves that remain closed are opposed to each other. Figure 5a discloses this phase of operation of the check valves.

During the time that the automobile is traveling in a straight course the rotary valves are positioned to open the bypasses 20 of the stabilizers or levelizers. With the bypasses 20 open, the pistons are free to reciprocate in their cylinders by the movements of the elements 12. The elements 12 receive their movements by the arms 19 connected to the shock absorber arms by the rods 41. Thus it will be seen that the stabilizers or levelizers in no way interfere with the normal operation of the shock absorbers nor the normal operation of the springs of the automobile during the time that the latter is traveling in a straight course. However, when the automobile turns to the right or left, the bypasses are closed by the rotary valves and one of the check valves of each stabilizer or levelizer is moved into an open position, depending in which direction the automobile turns so that the stabilizer or levelizer which is next to the outside curve will check the automobile body from tilting downwardly and the other stabilizer or levelizer will act to check or prevent the opposite side of the automobile body from raising thereby maintaining the automobile body on a substantially level keel while traveling upon the curve. As soon as the automobile returns to a straight course the bypasses 20 are opened, freeing the pistons for movement.

The automobile being steered to the right or left on a curve brings about operation of the rotary valves to close the bypasses 20 and to open one of the check valves of each stabilizer or levelizer, the valve being operated by the steering arm of the steering mechanism or by the movement of the pendulum, depending upon which my invention is connected to. When the valve is thus positioned each stabilizer will operate as follows, except opposite pistons of said stabilizers or levelizers will be free to move and the other piston will resist the movements of the arms 19 so that one side of the automobile body may move upwardly by wheels on said side of the automobile engaging road obstructions while the opposite side of the automobile body may move downwardly bringing about banking of the body on the curve in the roadway, the body being prevented from returning to level position until the automobile finishes its travel on the curve and begins travel on a straight course. The fluid in each stabilizer or levelizer acts as follows: The valve 22 assuming position to close the bypass and one check valve closed and the other check valve open the piston 14 is then free to yield by the movement of the arm 19 in one direction which displaces the fluid in the cylinder 10 through a portion of the bypass 20, one of the ports 30 and through the open check valve and unseats the closed check valve to pass through the other port 30 into the cylinder 9 and as the last-named check valve prevents reverse flow of the liquid, the piston 13 will be prevented from yielding by force from the arm 19 attempting to move in an opposite direction, thereby checking the movement of the arm 19 in said opposite direction until such time the rotary valve is moved to open the bypass 20 whereby the pistons and arm 19 may return to normal position.

During a right hand turn of the vehicle, this invention operates as follows: The steering mechanism of the vehicle being turned to steer said vehicle to the right operates the valve elements 22 in opposite directions which closes the bypasses 20 of the right and left hand stabilizers and the cams 32 thereof unseat one of the check valves 26 of the left hand stabilizer and unseat the other check valve 26 of the right hand stabilizer. The tendency of the left hand side of the vehicle body to lower on the right hand turn is checked by the piston 13 of the left hand stabilizer due to the fluid being trapped in the cylinder 9 thereof and the tendency of the right hand side of the vehicle body to rise is checked by the piston 14 of the right hand stabilizer, the fluid being trapped in the cylinder 10 thereof thus maintaining the vehicle body substantially level on said turn to the right. The operation of the pistons and valves of the stabilizers is reverse to that above described when the vehicle is steered to the left and a detail description is not thought necessary. The vehicle when travelling on the right hand turn and the pistons and valves operated as described, should the left hand wheels of said vehicle engage an obstruction, the left hand side of the vehicle body which has been checked against lowering is raised, bringing about movement of the piston 14 in the cylinder 10, forcing fluid from said cylinder 10 through a portion of the bypass 20, one of the ports 30 past the unseated check valve 26 through the other port 30 and the other portion of the bypass 20 to the cylinder 9 forcing the piston 13 to follow the piston 14 and thereby maintain the left hand side of the vehicle body in the position as raised by the obstruction, thereby banking the vehicle body and which will be in a direction of the right hand turn being made by the vehicle. During the return of the vehicle to a straight course the steering mechanism rotates the valve elements 22 in a reverse direction, opening the bypasses of the right and left hand stabilizers, permitting the fluid thereof to flow freely between the cylinders 9 and 10 so that the springs of the vehicle and the regular shock absorbers may operate normally.

Having described the invention, I claim:

1. A stabilizing device comprising a casting having a fluid chamber, opposed cylinders carried by said casting and in communication with the chamber, opposed spring-pressed pistons operating in said cylinders, a shaft journaled in the casting and extending through the chamber, an element secured to said shaft and engaged on opposite sides by the pistons, an axle connecting arm secured to the shaft to receive movements from the axle, said casting having a bypass connecting the cylinders to permit flow of liquid from one cylinder to the other and free movement of the pistons under the influence of the element connected to the shaft, means for opening and closing the bypass, and oppositely arranged check valves controlled by said means whereby either of said pistons may be restrained by the fluid and the other piston permitted to move under the influence of the element connected with the shaft.

2. A stabilizing device comprising a casting having a fluid chamber, opposed cylinders carried by said casting and in communication with the chamber, opposed spring pressed pistons operating in said cylinders, a shaft journaled in the casting and extending through the chamber, an element secured to said shaft and engaged on opposite sides by the pistons, an axle connecting arm secured to the shaft to receive movements from the axle, said casting having a bypass connecting the cylinders to permit flow of liquid from one cylinder to the other and free movement of the pistons under the influence of the element connected to the shaft, valve means for controlling said bypass said casting having check valve chambers in communication with the bypass, opposed check valves operating in said check valve chambers and alternatingly unseated by said valve means whereby either of said pistons may be restrained by the fluid against movement and the other piston allowed to yield by the movement of the element carried by the shaft.

3. A levelizing device comprising a casting, means for mounting said casting on a chassis of an automobile, said casting having a chamber, a shaft journaled in said casting and extending through the chamber, means for connecting the shaft to an axle of the automobile, opposed cylinders carried by said casting and in communication with the chamber, said casting having a bypass establishing communication between said cylinders, spring pressed pistons operating in cylinders and opposed to one another, an element secured to the shaft and engaged on opposite sides by the pistons for imparting movement to the pistons by the movement of the shaft, a rotary valve for controlling said bypass, said casting having check valve chambers in communication with the bypass at opposite sides of the rotary valve, opposed self-seating check valves operating in the check valve chambers, a cam formed on said rotary valve to alternatingly unseat the check valves in accordance with the direction of rotation of the rotary valve, and means connected to the rotary valve for imparting rotation thereto.

4. A levelizing device comprising a casting, means for mounting said casting on a chassis of an automobile, said casting having a chamber, a shaft journaled in said casting and extending through the chamber, means for connecting the shaft to an axle of the automobile, opposed cylinders carried by said casting and in communication with the chamber, said casting having a bypass establishing communication between said cylinders, spring pressed pistons operating in the cylinders and opposed to one another, an element secured to the shaft and engaged on opposite sides by the pistons for imparting movement to the pistons by the movement of the shaft, a rotary valve for controlling said bypass, said casting having check valve chambers in communication with the bypass at opposite sides of the rotary valve, opposed self-seating check valves operating in the check valve chambers, a cam formed on said rotary valve to alternatingly unseat the check valves in accordance with the direction of rotation of the rotary valve, and means connecting the rotary valve to a steering mechanism of the automobile.

5. A levelizing device comprising a casting, means for mounting said casting on a chassis of an automobile, said casting having a chamber, a shaft journaled in said casting and extending through the chamber, means for connecting the shaft to an axle of the automobile, opposed cylinders carried by said casting and in communication with the chamber, said casting having a bypass establishing communication between said cylinders, spring pressed pistons operating in the cylinders and opposed to one another, an element secured to the shaft and engaged on opposite sides by the pistons for imparting movement to the pistons by the movement of the shaft, a rotary valve for controlling said bypass, said casting having check valve chambers in communication with the bypass at opposite sides of the rotary valve, opposed self-seating check valves operating in the check valve chambers, a cam formed on said rotary valve to alternatingly unseat the check valves in accordance with the direction of rotation of the rotary valve, and a pendulum connected to the automobile and to the rotary valve.

ROCKFORD W. MOORE.